United States Patent [19]

Newberg

[11] Patent Number: 4,710,037
[45] Date of Patent: Dec. 1, 1987

[54] BEARING RETAINER STRUCTURE

[75] Inventor: Barry M. Newberg, Creve Coeur, Mo.

[73] Assignee: Emerson Electric Co., St. Louis, Mo.

[21] Appl. No.: 903,419

[22] Filed: Sep. 4, 1986

[51] Int. Cl.⁴ .................. F16L 35/077; B23P 19/04
[52] U.S. Cl. .................................. 384/537; 384/585; 29/229; 29/235; 29/451
[58] Field of Search .............. 384/537, 538, 539, 581, 384/535, 585, 903, 584, 559, 611, 617, 620, 561; 29/229, 235, 451, 724; 310/90

[56] References Cited

U.S. PATENT DOCUMENTS

| | | | |
|---|---|---|---|
| 3,147,050 | 9/1964 | Wulfert et al. | 384/537 |
| 3,881,792 | 5/1975 | Orain | 384/903 X |
| 4,089,570 | 5/1978 | Markfelder et al. | 384/510 |
| 4,236,767 | 12/1980 | Feldle | 384/539 X |
| 4,364,615 | 12/1982 | Euler | 384/903 X |
| 4,615,626 | 10/1986 | Iwaki | 384/539 |

FOREIGN PATENT DOCUMENTS

| | | | |
|---|---|---|---|
| 205816 | 10/1959 | Austria | 384/585 |
| 1521668 | 8/1978 | United Kingdom | 384/537 |

Primary Examiner—Stuart S. Levy
Assistant Examiner—David Werner
Attorney, Agent, or Firm—Polster, Polster and Lucchesi

[57] ABSTRACT

An improved bearing retainer structure having a hub supporting an annular bearing in which a shaft can be journaled, a preselected space being provided between the outer periphery of the bearing and the inner wall of the hub to receive an expansible-compressible fastening device which retains the bearing in position to enhance the resistance to torsional, axial and radial thrusts.

22 Claims, 4 Drawing Figures

BEARING RETAINER STRUCTURE

BACKGROUND OF THE INVENTION

This invention relates to an improved bearing retainer structure and more particularly to an improved endshield assembly structure for an electric motor including a novel bearing retainer arrangement and a tool for mounting the same.

It is known in the prior art to support an annular bearing in the hub portion of an endshield of an electric motor, the inner periphery of the bearing having the rotor shaft of the electric motor journaled therein. Various arrangements have been utilized to hold or retain the bearing in position in the hub portion including a more recent and now common arrangement of rolling or coining the inner edge of the hub to lap over an outer bearing face to retain and secure the bearing in position. This arrangement, however, as recognized by the present invention, has required comparatively complex and expensive assembly and machining steps, has placed undesirable stresses on both the endshield and bearing race, has led to the presence of undesirable particulate matter brought about by the rolling or coining operations and has prevented the repair and reuse of the completed assembly.

The present invention, recognizing these aforementioned limitations of past bearing retainer structures, provides a bearing retainer arrangement and an assembling tool therefor which are straightforward and economical in both manufacture and assembly, which serve to efficiently retain the bearing, torsionally, axially and radially, without requiring refined machining operations on the inner wall of the hub portion, and without the presence of undesirable machining particulate matter and undesirable bearing stresses and distortions and which, at the same, allow for rapid and economical assembly and disassembly for reuse of the major portion of the several parts involved in the assembly.

Various other features of the present invention will become obvious to one skilled in the art upon reading the disclosure set forth herein.

SUMMARY OF THE INVENTION

More particularly, the present invention provides an improved bearing retainer structure particularly adaptable to an endshield for an electric motor comprising: a bearing hub having support means to support a bearing thereon; an annular bearing mounted in the bearing hub with one face thereof resting on the support means of the hub to allow a shaft to be journaled therein, the bearing and hub being relatively sized to provide a preselected space therebetween to eliminate the need for machining operations; and, fastening means adapted to be inserted into press-fit relation in the space between hub and bearing to firmly retain the bearing in position to absorb torsional, axial and radial thrusts of the journaled shaft. In addition, the present invention provides a novel structure for centering the bearing in the hub and for applying a retaining pressure on the bearing at a preselected area on the bearing. Further, the present invention provides a novel tool assembly to press-fit the fastening means into desirable bearing retaining position.

It is to be understood that various changes can be made by one skilled in the art in the arrangement, form and construction of one or more of the several parts of the inventive structure disclosed herein without departing from the scope or spirit of the present invention. For example, the type and shape of the bearing retaining means and the assembly tool therefore can be modified without departing from the present invention.

BRIEF DESCRIPTION OF THE DRAWINGS

Referring to the drawings which discloses one advantageous embodiment of the present invention.

DETAILED DESCRIPTION OF THE DRAWINGS

Figure 1:
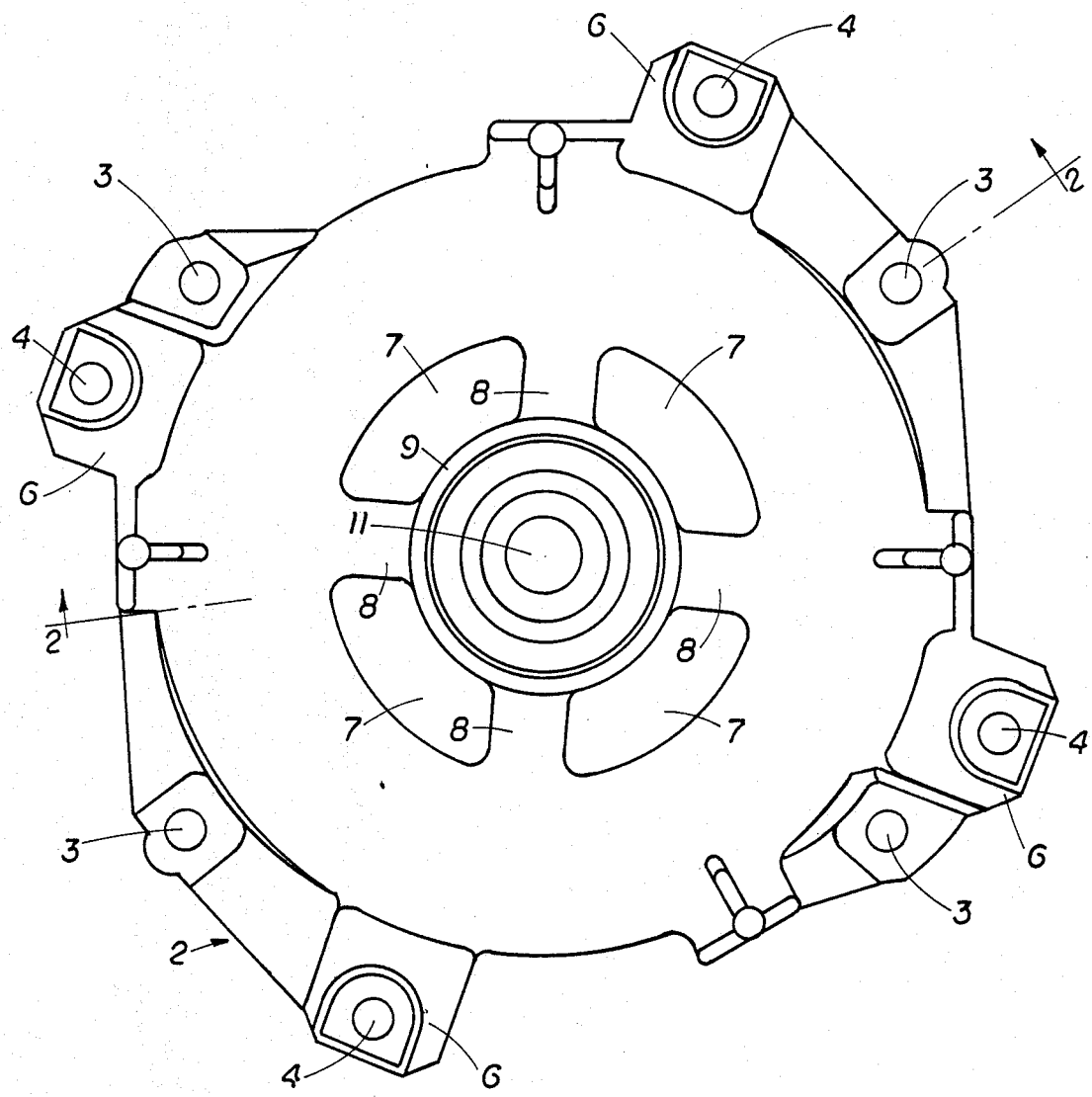
FIG. 1 is a top plan view of an endshield for an electric motor with the inventive endshield bearing retainer assembled therein to firmly retain the bearing therein.
Figure 2:
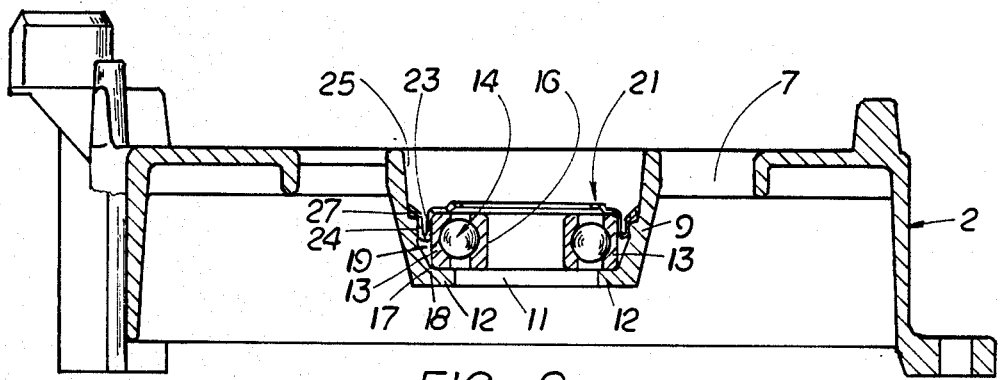
FIG. 2 is a cross-sectional view of the endshield assembly of FIG. 1, taken in a plane through line 2—2 of FIG. 1.

As can be seen in FIGS. 1 and 2 of the drawings, the endshield 2 which can be any one of several types of upper or even lower endshields known in the art for assembly to extending corner sections of a stator of an electric motor (not shown) by suitable fasteners (also not shown) which pass through apertures 3, the apertures 4 in mounting bosses 6 serving to receive mounting bolts (not shown) for mounting the electric motor to the apparatus with which the motor is to be associated, for example the sump of a dishwasher.

Advantageously, endshield 2 can be formed from an appropriately cast aluminum material with centrally disposed ventilation slots 7 separated by integral ribs 8 which serve to support hub or cradle 9 having an opening 11 therein into which a rotor shaft of an electric motor can be extended.

Figure 3:
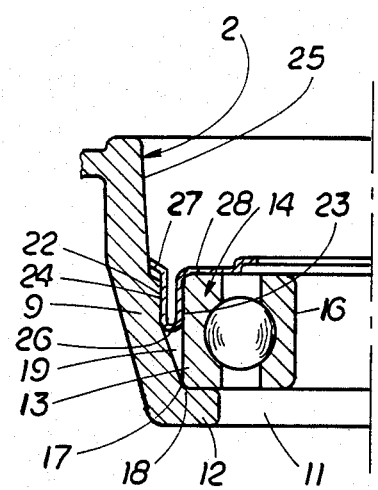
FIG. 3 is an enlarged cross-sectional view of a portion of the assembly of FIG. 2, disclosing details of the bearing retainer; and, FIG. 4 is a side view of a novel pressure tool which can be used in assembling the bearing retainer into proper retaining position.

As can be more fully seen in FIGS. 2 and 3 of the drawings, hub 9 is truncated with the sides thereof sloping inwardly toward the motor (not shown) on which the endshield 2 is to be mounted. The lower end of hub 9 is turned inwardly to provide a bearing support means in the form of an annular support lip 12 to receive and support the outer race 13 of annular ball bearing member 14. The inner race 16 serves to receive an electric motor shaft which is to be journaled therein.

It is to be noted that the outer race 13 is provided with a curvilinear corner surface at 17 to nest with a curvilinear corner 18 formed by inwardly projecting support lip 12 to thus permit ready centering of the annular bearing member 14. It is to be further noted that the outer periphery of annular bearing member 14 and surrounding hub 9 are relatively sized to provide an annular space 19 between the outer periphery of the outer race 13 of annular bearing 14 and the surrounding inner wall of hub 9. This arrangement of providing the annular space 19 between the inner wall of the hub and the outer periphery of the bearing eliminates the need for inner wall machining, the annular space 19 as shown being of tapered cross-section, narrowing toward the support lip 12 of hub 9.

Annular tapered space 19 between the hub and outer periphery of the bearing serves to receive the perimeter portion of an annular fastening member 21. The perimeter portion of fastening member 21, which is herein broadly designated by reference numeral 22, is of U-shaped cross-section with an integral downturned leg 23 and a substantially parallel spaced upturned leg 24, joined at the lower portion by curved integral corner surface 26 to provide an annular expansible-compressible ring adapted to be press-fit into the tapered space between the outer periphery of bearing member 14 and inner wall of hub 9. It is to be noted that upturned leg 24 has the free end thereof terminating in an outwardly turned lip 27, the lip 27 being so sized that the edge engages tightly with the inner wall 25 of hub 9 to enhance the resistance to torsional, axial and radial thrusts and to serve as a guide to center the fastening member during assembly, the curved integral corner surface 26 completing the centering of the bearing 14 started by nesting curvilinear corners 17 and 18 as abovedescribed. The surface of this inner wall 25 of hub 9 can be so selectively contoured as to provide a cam action with the tightly contacting edge of outwardly turned lip 27 to cause downturned leg 23 to bear against the outer periphery of the bearing member along a preselected area between or intermediate the opposed faces of the bearing member 14 when the expansible-compressible perimeter portion 22 is inserted into tapered annular space 19.

Fastening member 21 further includes a flat annular bearing face gripping portion 28 which extends from the upper part of downturned leg 23 opposite the outwardly turned lip 27 to engage the face of bearing member 14 opposite the face of the bearing member which rests on inwardly extending support lip 12 when fastening member 21 is press-fit into position.

Figure 4:
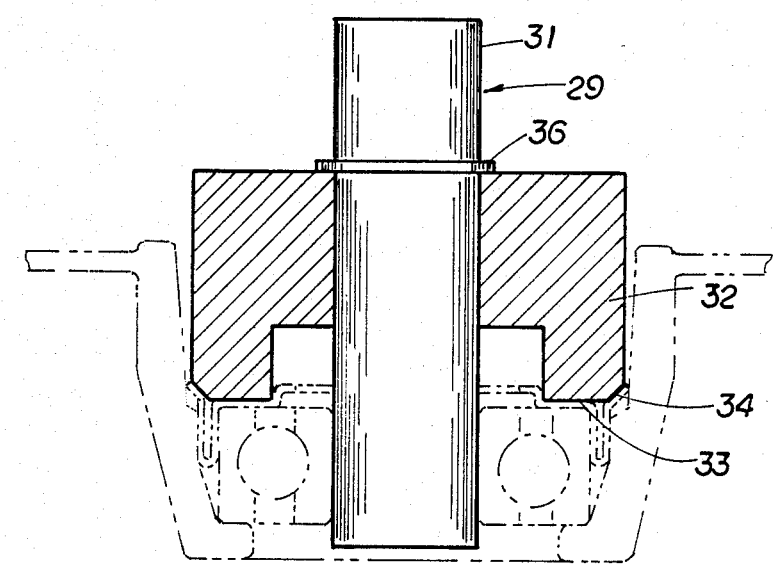

To provide for efficient and accurate press-fit engagement of fastening member 21, an assembling pressure tool 29 (FIG. 4) can be provided. Tool 29 is sized to cooperate with fastening member 21, bearing member 14 and hub 9 and includes a cylindrical pilot member 31 centrally disposed in an anvil member 32 which is slidably mounted thereon. Pilot member 31 is sized to nest with the inner race 16 of bearing member 14 and anvil member 32 is provided with an annular striking base 33 sized to engage against bearing face gripping portion 28 of fastening member 21 to permit said anvil 32 to urge the fastening member 21 into press-fit relation in tapered annular space 19 to thus secure the bearing member 14 from torsional, axial and radial thrusts. It is to be noted that anvil 32 is provided with a chamfered peripheral edge 34 extending from striking base 33, edge 34 being sized and contoured to engage against outwardly turned lip 27, advantageously at an approximate 45° angle, so that during pressfit operations lip 27 follows the taper of inner wall of hub 9 to provide the aforedescribed cam action. It is further to be noted that pilot member 31 can be provided with a suitable stop washer 36 to limit sliding movement of anvil 32 thereon.

It is to be understood that various changes can be made by one skilled in the art in the apparatus abovedescribed without departing from the scope or spirit of this invention. For example, it would be possible to change the contour of the inner wall of the hub so that the relative spacing between it and the outer periphery of the bearing would have a different geometry from that disclosed. It also would be possible to mount other types of bearings different from the annular bearing disclosed to support a rotor shaft.

The invention claimed is:

1. In combination, an improved end assembly structure for an electric motor comprising:

an endshield adapted to be mounted adjacent one end of said motor;

a bearing hub in said endshield, said hub having support means to support a bearing thereon;

an annular bearing having an outer periphery, said bearing being mounted in said bearing hub with one face thereof resting on said support means of said hub to permit a rotor shaft of said motor to be journaled therein, said hub having an inner wall radially spaced from said outer periphery of said bearing, said bearing and said hub being sized relative each other to provide a preselected space between said inner wall of said hub and said opposed outer periphery of said bearing, said space extending from one face of said bearing to the opposite face to eliminate the need for machining operations; and, fastening means adapted to be inserted into press-fit relation in said preselected space between said hub and bearing in contact with said inner wall of said hub and said outer periphery of said bearing to retain said bearing firmly in position to absorb torsional, axial and radial thrusts of a rotor shaft journaled in said bearing.

2. The combination of claim 1, and a pressure tool sized to engage said fastening means to urge the same into press-fit relation in said preselected space between said hub and bearing, said pressure tool including a central pilot member sized to nest with the inner race of said annular bearing and an anvil member mounted thereon sized to urgeably engage said fastening means for insertion into press-fit relation in said preselected space between said hub and bearing.

3. The combination of claim 1, said bearing and said hub being sized to provide an annular space between the outer periphery of said bearing and the inner wall of said hub;

said fastening means including an expansible-compressible annular ring press-fitted into said annular space to firmly retain said bearing in position.

4. The combination claim 1, said support means and said bearing having nesting curvilinear surfaces to center the bearing in said support means.

5. The combination of claim 1, said bearing and said hub being sized to provide an annular space defined between the outer periphery of said bearing and the inner wall of said hub, said fastening means comprising an expansible-compressible annular ring press-fitted into said annular space to firmly retain said bearing in position, the preselected spacing between the inner wall of said hub and the outer periphery of said bearing eliminating the need for machining operations.

6. The combination of claim 1, said fastening means including a bearing face grip portion integral therewith and extending therefrom to engage the face of said bearing opposite the face resting on said support means.

7. The combination of claim 1, said fastening means including an outwardly turned extremity sized to engage tightly with the inner wall of said hub to enhance resistance to torsional, axial and radial thrusts.

8. The combination of claim 1, said fastening means including a caming portion integral therewith and cooperable with the inner wall of said hub to localize the press-fit relationship between said hub and bearing at a preselected area between opposed faces of said bearing.

9. The combination of claim 1, said bearing and said hub being sized to provide an annular space of tapered cross-section between the outer periphery of said bearing and the inner wall of said hub;
  said fastening means comprising an expansible-compressible annular ring press-fitted into said annular space to firmly retain said bearing in position, the relative contour of the inner wall of said hub and the outer periphery of said bearing being positioned to provide maximum caming contact by said expansible-compressible annular ring against said bearing along a preselected area of said outer periphery of said bearing intermediate the opposed faces of said bearing, said fastening means further including a bearing face grip portion integral therewith and extending therefrom to engage the face of said bearing opposite the face resting on said support means and a caming portion integral therewith and cooperable with the inner wall of said hub to provide said maximum caming contact along said preselected area of said outer periphery of said bearing;
  said support means on said hub and said bearing having nesting curvilinear surfaces to center the bearing in said support means.

10. The combination of claim 1, said bearing and said hub being sized to provide an annular space of tapered cross-section between the outer periphery of said bearing and the inner wall of said hub, said tapered cross-section narrowing toward said support means on said bearing hub;
  said fastening means comprising an expansible-compressible annular ring having an upturned perimeter portion of U-shaped cross-section with the free end thereof terminating in an outwardly turned lip extremity which engages with the inner wall of said hub which is tapered to cam said U-shaped cross-section against said bearing along a preselected area of said outer periphery of said bearing intermediate the opposed faces of said bearing when said perimeter portion of U-shaped cross-section is press-fit into said annular space of tapered cross-section, said fastening means further including an annular bearing face grip portion extending inwardly opposite said outwardly turned lip extremity to engage the face of said bearing opposite the face resting on said support means;
  said support means on said hub and said bearing having nesting curvilinear surfaces to center said bearing in said support means.

11. The combination of claim 10; and a pressure tool including a central pilot member sized to nest with the inner race of said annular bearing and an anvil member, said anvil member having an annular striking base sized to engage said bearing face grip portion of said fastening means and a chamfered peripheral edge extending from said base geometrically sized and contoured to engage said outwardly turned lip extremity of said upturned perimeter portion to urge said fastening means into press-fit relation in said space between said hub and bearing with said lip following the taper of said wall to cam said U-shaped perimeter portion against the outer periphery of said bearing.

12. An improved bearing retainer structure for mounting a bearing comprising:
  a bearing hub, said hub having support means to support a bearing thereon;
  an annular bearing having an outer periphery, said bearing being mounted in said bearing hub with one face thereof resting on said support means of said hub to permit a shaft to be journaled therein, said hub having an inner wall radially spaced from said outer periphery of said bearing, said bearing and said hub being sized relative each other to provide a preselected space between said inner wall of said hub and said opposed outer periphery of said bearing, said space extending from one face of said bearing to the opposite face to eliminate the need for machining operations; and,
  fastening means adapted to be inserted into press-fit relation in said preselected space between said hub and bearing in contact with said inner wall of said hub and said outer periphery of said bearing to retain said bearing firmly in position to absorb torsional, axial and radial thrusts of a shaft journaled in said bearing.

13. The combination of claim 12, and a pressure tool sized to engage said fastening means to urge the same into press-fit relation in said preselected space between said hub and bearing, said pressure tool including a central pilot member sized to nest with the inner race of said annular bearing and an anvil member mounted thereon sized to urgeably engage said fastening means for insertion into press-fit relation in said preselected space between hub and bearing.

14. The combination of claim 12, said bearing and said hub being sized to provide an annular space between the outer periphery of said bearing and the inner wall of said hub;
  said fastening means including an expansible-compressible annular ring press-fitted into said annular space to firmly retain said bearing in position.

15. The combination of claim 12, said support means and said bearing having nesting curvilinear surfaces to center the bearing in said support means.

16. The combination structure of claim 12, said bearing and said hub being sized to provide an annular space defined between the outer periphery of said bearing and the inner wall of said hub, said fastening means comprising an expansible-compressible annular ring press-fitted into said annular space to firmly retain said bearing in position, the preselected spacing between the inner wall of said hub and the outer periphery of said bearing eliminating the need for machining operations.

17. The combination of claim 12, said fastening means including a bearing face grip portion integral therewith and extending therefrom to engage the face of said bearing opposite the face resting on said support means.

18. The combination of claim 12, said fastening means including an outwardly turned extremity sized to engage tightly with the inner wall of said hub to enhance resistance to torsional, axial and radial thrusts.

19. The combination of claim 12, said fastening means including a caming portion integral therewith and cooperable with the inner wall of said hub to localize the press-fit relationship between said hub and bearing at a preselected area between opposed faces of said bearing.

20. The combination of claim 12, said bearing and said hub being sized to provide an annular space of tapered cross-section between the outer periphery of said bearing and the inner wall of said hub;
  said fastening means comprising an expansible-compressible annular ring press-fitted into said annular space to firmly retain said bearing in position, the relative contour of the inner wall of said hub and the outer periphery of said bearing being positioned to provide maximum caming contact by said expansible-compressible annular ring against said bearing along a preselected area of said outer periphery of said bearing intermediate the opposed faces of said bearing, said fastening means further including a bearing face grip portion integral therewith and extending therefrom to engage the face of said bearing opposite the face resting on said support means and a caming portion integral therewith and cooperable with the inner wall of said hub to provide said maximum caming contact along said preselected area of said outer periphery of said bearing;

said support means on said hub and said bearing having nesting curvilinear surfaces to center the bearing in said support means.

21. The combination of claim 12, said bearing and said hub being sized to provide an annular space of tapered cross-section between the outer periphery of said bearing and the inner wall of said hub, said tapered cross-section narrowing toward said support means on said bearing hub;

said fastening means comprising an expansible-compressible annular ring having an upturned perimeter portion of U-shaped cross-section with the free end thereof terminating in an outwardly turned lip extremity which engages with the inner wall of said hub which is tapered to cam said U-shaped cross-section against said bearing along a preselected area of said outer periphery of said bearing intermediate the opposed faces of said bearing when said perimeter portion of U-shaped cross-section is press-fit into said annular space of tapered cross-section, said fastening means further including an annular bearing face grip portion extending inwardly opposite said outwardly turned lip extremity to engage the face of said bearing opposite the face resting on said support means;

said support means on said hub and said bearing having nesting curvilinear surfaces to center said bearing in said support means.

22. The combination of claim 21; and a pressure tool including a central pilot member sized to nest with the inner race of said annular bearing and an anvil member, said anvil member having an annular striking base sized to engage said bearing face grip portion of said fastening means and a chamfered peripheral edge extending from said base geometrically sized and contoured to engage said outwardly turned lip extremity of said upturned perimeter portion to urge said fastening means into press-fit relation in said space between said hub and bearing with said lip following the taper of said wall to cam said U-shaped perimeter portion against the outer periphery of said bearing.

* * * * *